Patented May 21, 1935

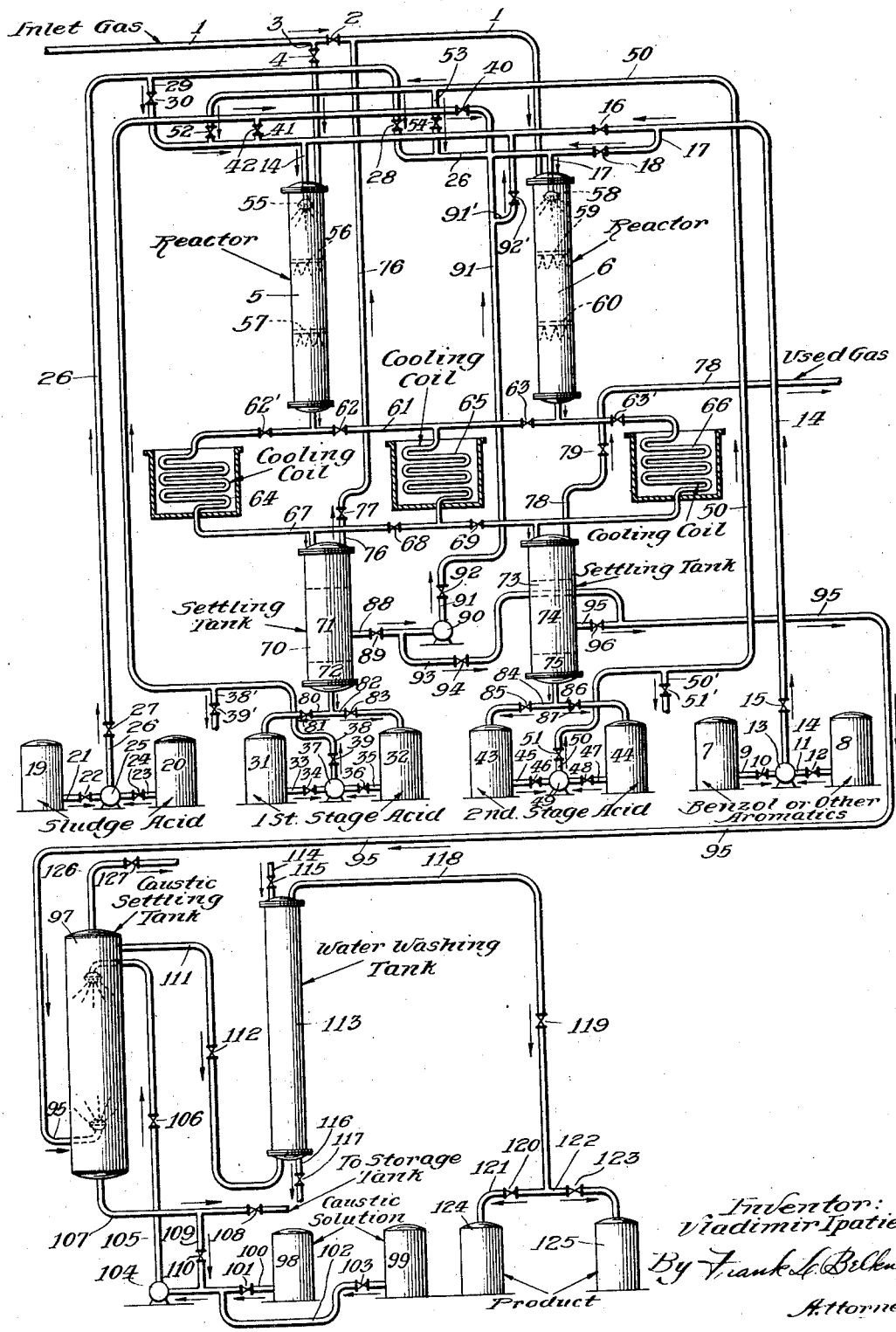

2,001,909

UNITED STATES PATENT OFFICE 2,001,909

TREATMENT OF HYDROCARBONS

Vladimir Ipatieff, Chicago, Ill., assignor to Universal Oil Products Company, Chicago, Ill., a corporation of Delaware Application October 26, 1932, Serial No. 639,621

6 Claims. (Cl. 196—10)

This invention refers more particularly to the synthesis of hydrocarbons boiling within the range of commercial gasoline though it is applicable to the production of compounds of higher boiling character which are suitable for blending with gasoline.

In a more specific sense the invention relates to a process carried on under controlled temperature conditions involving the chemical combination of unsaturated chain hydrocarbon compounds with cyclic hydrocarbon compounds to form synthetic derivatives of a mixed character. In the application of the process to the production of hydrocarbon fractions of motor fuel, the effect of the process is also to increase the anti-knock value, though other refining effects may be and are frequently produced in the direction of reduction in sulfur content.

In one specific embodiment the invention comprises treatment of reactive cyclic hydrocarbons, particularly aromatic hydrocarbons, with olefin hydrocarbons, particularly those gaseous under ordinary conditions, in the presence of sulfuric acid sludges to produce hydrocarbon compounds of a character and boiling range suitable for use as anti-knock constituents of gasolines.

As an example of the reactions involved in the process, when propylene is passed into a well stirred mixture of benzol and concentrated sulfuric acid in proper proportions, the main product is mono-iso-propyl benzol according to the following reaction:

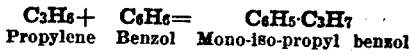
Propylene Benzol Mono-iso-propyl benzol

There may also be produced concurrently a limited yield of di-iso-propyl benzol according to the following equation:

Propylene Benzol Di-iso-propyl benzol the relative production of the two compounds being dependent upon such factors as the relative proportion of the two hydrocarbons employed, the amount of sulfuric acid present and the exact temperature which to some extent controls the rate and course of the reaction.

Polymerization of the olefins also occurs, which increases the yield of liquid products having high anti-knock characteristics.

A feature of the present invention is that sludge acids resulting from the treatment of liquids or gases are used. When sulfuric acid itself is used to catalyze reactions of the general character just described its strength must be carefully controlled and the temperature at which the reactions are conducted must be held below a certain point if best results are to be secured in the production of yields of products of the desired boiling range and quality. For example, in the reactions between propylene and benzol just described best results are obtained if the temperature is maintained in the neighborhood of 0° C. When the reactions leading to the formation of alkyl derivatives of benzol predominate, it would appear that the initial stage of the reactions corresponds to the formation of sulfuric acid esters of olefins and sulfonic acids of benzol, which further react to form the alkylated aromatic and regenerate the sulfuric acid. When sulfuric acid over a certain limit strength is employed, or temperatures are allowed to rise, or there is a lack of intimate contact between the reacting constituents, there is an increased tendency toward the formation of polymers of the olefins. This is particularly noticeable in employing olefinic hydrocarbons which occur in gases from cracking processes, since there are numerous types of olefins of highly unsaturated character present whose polymers are of a gummy or tarry character and hence undesirable in the alkylated product which is primarily intended for use as a blending material to improve the anti-knock characteristics of motor fuel. Furthermore, unless conditions are kept within narrow limits, there is a tendency for the formation of highly alkylated hydrocarbons which may contain, for example, three or four substituting groups and which are of too high boiling character to be used in gasoline without unduly increasing its end boiling point. The economy factor is also apparent as in most cases the sludge acid is a waste product.

It has been found that if sludge acids are employed in place of fresh acid that the conditions of operation in alkylating aromatics to produce gasoline boiling range compounds admit of considerably greater latitude. There is less tendency toward the formation of gummy polymers or too highly alkylated compounds and owing to the more selective and moderate nature of the reactions there is a decreased tendency toward excessive temperature rise due to heat of reaction, and proper conditions of treatment are more easily maintained in practice. There is also a difference in the reaction when comparing a sludge acid with a diluted acid of similar sulphuric acid content, the sludge apparently containing compounds which in themselves function as catalysts.

The term "sludge acid" as used in the present specification may refer to any of the partly spent acids resulting from treatments upon any of the miscellaneous oils treated in connection with the refining of petroleum, and it also includes in its meaning sludges which may be produced in alkylating aromatics with olefins where fresh acid was employed, the last-named class being in a sense recirculated acid. In general, the invention comprises the use of sludges resulting from the sulfuric acid treatment of such miscellaneous oils as gasolines, both cracked and straight run, naphthas, kerosenes, lubricating oils, cracked gases, et cetera. Since the object in using sludge acid is to catalyze the desired reactions by acids diluted by soluble organic products rather than by water, it is also comprised within the scope of the invention to synthetically produce a sludge acid of desired characteristics by properly blending a sludge acid with fresh or unused sulfuric acid to produce a reagent of the desired activity. Obviously, this procedure admits of the production of a large number of reagents of properties varying generally with the percentage and strength of free sulfuric acid present and while a number of alternatives are possible it is to be understood that they are not necessarily equivalent in their action.

In place of aromatic hydrocarbons, the process comprises the use of cyclic hydrocarbons of a benzenoid character, such compounds being for example, terpenes or naphthenes insofar as they react with the olefins to produce hydrocarbon compounds of desired characteristics. As a general rule the reactivity of cyclic hydrocarbons with olefins in the presence of sulfuric acid is a function of their degree of unsaturation, insofar as this term may be applied to double bonds between the carbon atoms in cyclic compounds. This type of unsaturation, however, is not to be confused with the type represented by double bonds between carbon atoms in chain compounds, since they differ materially in respect to their interaction with such reagents as the halogens, oxygen, sulfuric acid, et cetera.

The process of the invention is advantageously employed in connection with the utilization of the olefins in the gases produced as a by-product of oil cracking processes whose primary object is the production of gasoline. The amount of gas produced in such processes varies generally with the intensity of cracking conditions and the olefinic content of such gases is frequently very high, sometimes running 40 to 50% by volume in the case of gases produced in high temperature-low pressure vapor phase cracking processes. Such gases contain large amounts of ethylene, propylene, butylenes, and amylenes though usually propylene predominates, this particular olefin frequently constituting as high as 30% of the total gas mixture.

According to the process of the invention, individual olefins or mixtures of olefins and other hydrocarbon gases such as those present in gases from oil cracking processes are contacted with aromatics or other reactive cyclic hydrocarbons in the presence of sludge acid. While the process is not limited to the use of any particular type of apparatus or plant arrangement it will assist in defining its character to describe an operation in connection with one arrangement of inter-connected elements which may be employed and for this purpose the attached drawing is provided which shows diagrammatically and without reference to any particular scale, an arrangement of apparatus which may be employed.

Referring to the drawing, the essential features of the plant shown are seen to be a source of supply for olefin-containing gas, aromatic liquid and sludge acid, chambers in which the gas and liquids are reacted in the presence of the acid, settlers for separating the alkylated product from partly spent acids and neutralizing and washing tanks. The last named are not a special feature of the process as the neutralizing and washing of products from acid-treatments is well established in the art and furthermore the layout shown provides no means for redistilling the purified product though this may be done if and when necessary. Obviously, the exact type of mixer for liquid hydrocarbon, acid and gas will be modified to obtain best results in any given case and the details of construction may be altered in accordance with special needs. However, the operation to be described is sufficiently illustrative.

In the drawing shown an olefin-containing gas such as the mixture produced from an oil cracking process is introduced to the system through a line 1, containing control valve 2, line 1 having a branch line 3, containing control valve 4. It is assumed for the purposes of the present discussion that the gas is under sufficient pressure as it comes from a cracking plant so that pumping means are not necessary. An inlet gas pressure of about 100 pounds may be desirable in processes of the present character as there is considerable differential encountered in the flow through the apparatus and the reactions are further assisted by pressure as will be later developed. In the present set-up, line 3 conducts the gas to a primary reactor 5 while line 1 serves to conduct it to a secondary reactor 6. The reactors are provided with sprays 55 and 58, respectively, and also superimposed perforated plates 56, 57, 59 and 60, as shown, to break up the oil and acid into a fine spray or mist which is thus brought into intimate contact with the gas, the reaction taking place with all constituents flowing downwardly.

In the arrangement shown the order of the reactors may be reversed, since the acid, gas and oil lines are manifolded but for purposes of the present description reactor 5 will be considered as the primary reactor in which the inlet gas rich in olefins is contacted with fresh hydrocarbon liquid in the presence of partly spent acid, while the residual gas from this primary operation is contacted with separate portions of hydrocarbon liquid in secondary reactor 6 in the presence of stronger acid. The concurrent flow principle of treatment, which is shown as a feature of the process in connection with the drawing, while a convenient and efficient mode of operation, is not an essential feature of the present invention, which may comprise operations of a once-through or batch character. The principle of concurrent flow treatment in connection with the present process may be applied in still other ways than that shown, since there are three separate substances participating in the general reactions to-wit, olefin-containing gases, hydrocarbon liquid and sulfuric acid. To enumerate some of the possible combinations it may be stated that (1) gases and hydrocarbon liquids may be directed counter-current to acid, (2) acid and hydrocarbon liquids may be directed counter-current to gases and (3) acid and gases may be directed countercurrent to hydrocarbon liquid Any of these particular operations are comprised within the scope of the invention and may be utilized at particular times although for purposes of clarity the description of an operation in which acid is passed concurrent flow to hydrocarbon liquids and gases is generally adhered to.

The incoming gas is thus introduced to reactor 5 through line 3 while fresh hydrocarbon liquid mixed with sludge acid is introduced from line 14. All supply tanks and receivers are shown in duplicate arrangement to assist in assuring continuous operation of the process. Thus, hydrocarbon liquid may be taken by pump 13 from supply tanks 7 or 8 either through line 9 containing control valve 10 or line 11, containing control valve 12, and discharged through line 14, containing control valves 15 and 16, into reactor 5 as shown. Line 17, containing control valve 18, provides for the introduction of the hydrocarbon liquid into secondary reactor 6. Sludge acid from the reactions in the primary reactor 5 may be taken from either receiver 31 or 32 through line 33, containing control valve 34, or line 35, containing control valve 36, respectively, and pumped by pump 37 through line 38, containing control valve 39, to line 41, containing control valve 42, and thence to line 14 and spray 55. The sludge acid catalyst may be continuously circulated to insure its maximum utilization and when its effectiveness is reduced below an economical point by the gradual accumulation of soluble esters, etc., a portion of it may be continuously or intermittently discharged through branch line 38', containing valve 39', and the necessary amount of make-up acid, either fresh or sludge, introduced from the primary sludge acid supply. If desired, or if advantages are gained thereby, partly spent acid from the reactions in the secondary reactor 6, obtained from tanks 43 and 44, may be recycled to the primary reactor 5, valve 54 being entirely or partially closed and valve 52 being open at such times. In ordinary operations the sludge product from the secondary reactor will be circulated by way of line 53, containing control valve 54, line 26 and line 17 until its efficiency drops below an economical point.

To reduce polymerization and undesirable side reactions the products from the reactor are discharged in toto through a cooling coil prior to their separation into a sludge acid layer, alkylated liquid and unreacted gases. Thus, a header 61 contains valves 62, 62', 63 and 63' and permits the utilization of cooling coils 64, 65 and 66 as may be found most expedient. Similarly, a header 67 may receive cooled products from any one of the three coolers and direct the cooled products to either one of settling tanks 70 and 73 by the proper manipulation of valves 68 and 69.

In settling tank 70, gas, hydrocarbon liquid and sludge acid from the primary reactor separate, the gas being released through line 76, containing control valve 77, to line 1 leading to secondary reactor 6. The liquid product shown as layer 71 may, as desired, be recirculated to the primary reactor, further treated in the secondary reactor or withdrawn from the process for neutralizing and washing as a final product. In the first case a pump 90 may withdraw the liquid layer through line 88, containing a control valve 89, and return the partially alkylated liquid to the primary reactor by way of line 91 and valve 92, line 91' and valve 92' and line 14. When the partially alkylated liquid products from the reactor are to be treated in the secondary reactor, valve 92' is closed and the liquid proceeds to the secondary reactor by way of lines 26 and 17. In the event that further alkylation is not desired the liquid product may be diverted into line 93, containing control valve 94, and thus through line 95, containing control valve 96 (which serves a similar purpose for the corresponding material in settling tank 73) into neutralizing tank 97 to be later described.

Partly spent acid from settling tank 70 shown as layer 72 may be drawn to intermediate accumulators 31 and 32 through line 80, containing control valve 81, or line 82, containing control valve 83, respectively, as may be expedient. When the sludge acid from this stage is to be further used, pump 37 is used for recirculating the first stage sludge acid into reactor 5, the stream being diverted through line 41, containing control valve 42, valve 40 being closed.

In secondary reactor 6, according to the flow at present being described, fresh or partly alkylated hydrocarbon liquid is contacted with the olefin-containing gas from the first reactor in the presence of sludge acid of relatively greater activity. The main advantage gained by this operation is that more acid may be used and a higher rate of alkylation effected without increased tendency toward polymerization among the olefins, since these no longer comprise the more readily reactive members which were lost in the primary reactor. Thus, sludge acid from a source outside the process may be taken from supply tanks 19 or 20 through line 21, containing control valve 22 or line 23, containing control valve 24, respectively, and pumped by pump 25 through line 26, containing control valves 27 and 28, into secondary reactor 6. The products of this second stage in respect to the gas or the primary stage in respect to the acid may then be discharged through a cooler selected from those already described and passed to a settling tank, in the present instance settling tank 73 which shows again alkylated hydrocarbon liquid as layer 74 and sludge acid as layer 75. The gas from this stage, being now substantially free from reactive olefins, is vented through line 78, containing control valve 79, and may be put to any use for which it is suited.

The sludge acid from the second stage is drawn from settling tank 73 to tanks 43 and 44 through line 84, containing control valve 85, or line 86, containing control valve 87, and may be further used in either of the reactors as its strength may indicate, though in the preferred mode of operation it will be used in the primary reactor 5 for reasons which have been already given. Thus pump 49 may withdraw this acid from tank 43 through line 45, containing control valve 46, or from tank 44 through line 47, containing control valve 48, and discharge it through line 50, containing control valves 51 and 52. When this sludge acid is to be used in primary reactor 5, valves 51 and 52 will be opened and the acid will pass directly to line 14. If used for any reason in secondary reactor 6 it may be diverted through branch line 53, containing control valve 54, and ultimately reach the reaction zone through line 17. Line 50', containing valve 51', is provided to permit the discharge from the system of the spent acid resulting from the reactions in the secondary reactor, the make-up acid being introduced from a fresh supply or the primary supply consisting of sludge having a relatively high sulfuric acid concentration.

The alkylated hydrocarbons from settling tank 70

73 may be passed to the neutralizing tank through line 95, containing control valve 96, either alone or in admixture with analogous products from settling tank 70 as previously described. Caustic soda of any desired strength may be taken from tanks 98 and 99 through line 100, containing control valve 101, or line 102, containing control valve 103, and pumped by a suitable pump 104 through line 105, containing control valve 106, from which it is allowed to pass downwardly counterflow to the ascending alkylated products. The neutralizing tank is preferably so designed that the rates of oil and alkali can be adjusted and a substantially neutral or slightly alkaline liquid may be recovered from the top of the tank, this liquid passing through line 111, containing control valve 112, into a water washing tank 113. To provide for the removal of any accumulation of gases a vent line 126, containing control valve 127, is provided in the top of the neutralizer. Line 107, containing control valve 108, permits the removal of spent neutralizing liquor. Line 109 containing control valve 110 is provided to permit the recirculation of a portion or all of the caustic solution as long as it retains sufficient neutralizing power.

In the water washing tank the same counterflow method may be employed, water being introduced through a line 114, containing control valve 115 in the form of a spray and the washed product drawn from the top of the tank through a line 118, containing control valve 119, and passing either to final receiver 124 through line 121, containing control valve 120, or to receiver 125 through line 122, containing control valve 123.

Best results in the case of treatment of low boiling aromatics such as benzol or hydrocarbon mixtures of approximate gasoline boiling point range are usually obtained when the reactions are conducted under approximately 50 to 100 pounds per square inch pressure, since less volatile liquid is carried along in the gas stream and probably the desired alkylation reactions are assisted. Pressure, therefore, is preferably maintained up to valves 79, 94 and 96, neutralizing and washing being conducted according to common practice under atmospheric pressure.

As a characteristic example of the results obtainable by the use of the process, the alkylation of commercial benzol by propylene may be cited. A sludge acid resulting from the treatment of kerosene distillate to improve its color and burning properties may be used as catalyst, this sludge acid showing by analysis a sulfuric acid equivalent of about 75 to 80%. Such a sludge acid may be maintained in suspension in benzol (the acid being used at the rate of about 15% by volume of the benzol) by mechanical stirring devices and propylene contained in a gas mixture from a cracking plant may be bubbled through the suspension. As a result of this treatment, in which the temperature is maintained at approximately 100° F. by means of cooling coils, there may be produced a yield of approximately 145% of mono-iso-propyl benzol, along with a concurrent production of about 5% of the di-substituted product. In contrast to the use of sulfuric acid the yield of the monosubstituted product is higher and that of the di-substituted product is lower.

The foregoing specification and example, while sufficiently describing and exemplifying the nature of the process, are not to be construed as imposing undue or special limitations upon the generally broad scope of the invention.

I claim as my invention:

1. A process for the treatment of aromatic hydrocarbons to produce high anti-knock motor fuels therefrom and to increase the volume thereof suitable for high anti-knock motor fuels, which comprises simultaneously subjecting said aromatic hydrocarbons and gases resulting from a cracking process to the action of preformed sludge acid produced in the treatment of hydrocarbons with sulphuric acid, and recovering the resulting liquid product.

2. A process for the treatment of aromatic hydrocarbons to produce high anti-knock motor fuels therefrom and to increase the volume thereof suitable for high anti-knock motor fuels, which comprises simultaneously subjecting said aromatic hydrocarbons and gases containing olefin hydrocarbons to the action of preformed sludge acid produced in the treatment of hydrocarbons with sulphuric acid, and recovering the resulting liquid product.

3. A process for the treatment of benzene to produce high anti-knock motor fuels therefrom and to increase the volume thereof suitable for high anti-knock motor fuels, which comprises simultaneously subjecting the benzene and gases containing olefin hydrocarbons to the action of preformed sludge acid produced in the treatment of hydrocarbons with sulphuric acid, and recovering the resulting liquid product.

4. A process for the treatment of aromatic hydrocarbons to produce high anti-knock motor fuels therefrom and to increase the volume thereof suitable for high anti-knock motor fuels, which comprises simultaneously subjecting said aromatic hydrocarbons and gases resulting from a cracking process to the action of preformed sludge acid derived from the treatment of cracked hydrocarbon oil with sulphuric acid, and recovering the resulting liquid product.

5. A process for the treatment of aromatic hydrocarbons to produce high anti-knock motor fuels therefrom and to increase the volume thereof suitable for high anti-knock motor fuels, which comprises simultaneously subjecting said aromatic hydrocarbons and gases resulting from a cracking process to the action of preformed sludge acid derived from the treatment of cracked gases with sulphuric acid, and recovering the resulting liquid product.

6. In the alkylation of cyclic hydrocarbons of a benzenoid character, the method which comprises reacting the cyclic hydrocarbon with olefine hydrocarbon in the presence of preformed sludge acid produced in the treatment of hydrocarbons with sulphuric acid.

VLADIMIR IPATIEFF.